July 11, 1967 F. E. DUCKWALL ET AL 3,330,331
METHOD AND APPARATUS FOR BLOCKING A LENS BLANK
Filed Sept. 18, 1964 5 Sheets-Sheet 1

INVENTORS.
FRANK E. DUCKWALL and
BY JOHN D. SPRAGG

*Lockwood, Woodard, Smith & Weikart*
Attorneys

July 11, 1967   F. E. DUCKWALL ETAL   3,330,331
METHOD AND APPARATUS FOR BLOCKING A LENS BLANK
Filed Sept. 18, 1964   5 Sheets-Sheet 2

INVENTORS.
FRANK E. DUCKWALL
BY and JOHN D. SPRAGG
Lockwood, Woodard, Smith & Weikart
Attorneys INVENTORS.
FRANK E. DUCKWALL
BY and JOHN D. SPRAGG
Lockwood, Woodard, Smith & Weikart
Attorneys INVENTORS.
FRANK E. DUCKWALL and
JOHN D. SPRAGG 3,330,331
**METHOD AND APPARATUS FOR BLOCKING
A LENS BLANK**
Frank E. Duckwall and John D. Spragg, Indianapolis,
Ind., assignors to Textron, Inc., Providence, R.I., a corporation of Rhode Island
Filed Sept. 18, 1964, Ser. No. 397,445
15 Claims. (Cl. 164—112)

The present invention relates to a method and apparatus for molding, said method and apparatus being particularly adapted for forming improved lens blocks for holding lens blanks during the grinding and polishing thereof, and for mounting lenses on said blanks.

Various methods and apparatus have been conceived for holding lens blanks during the abrading thereof. While these methods and apparatus have been successful in solving some of the problems involved in the blocking of lenses, they have not solved all such problems. For example, it is desirable that a lens not overhang or overlap the block upon which it is mounted in order that the lens be fully supported and not be chipped in the grinding and polishing operations. It is also desirable that the lens block be relatively thin walled in order that the molding materials harden rapidly, in order that expensive molding material is conserved and in order that springing or distortion of the lens from different coefficients of size change in cooling is avoided.

Consequently, one object of the present invention is to provide an improved method and apparatus for molding.

Another object of the present invention is to provide a method and apparatus for blocking a lens in such a manner that it does not overhang the lens block.

Still another object of the present invention is to provide a method and apparatus for blocking a lens in such a manner that the lens block is thin walled with resulting advantages.

A further object of the invention is to provide a method and apparatus for blocking a lens in such a manner that block height can be easily adjusted.

Still a further object of the invention is to provide a method and apparatus for blocking a lens having a finished toric curve with its opposite surface exposed in such a manner that the lens is properly centered and "squared" so that the grinding and polishing of the opposite surface is effected with the toric curve at the correct angle, position and attitude.

The full nature of the invention will be understood from the accompanying drawings and the following description and claims.

Referring more particularly to the drawings, there is illustrated a molding apparatus which includes four stations 10, 11, 12, and 13. Molten metal is supplied to the four stations 10–13 from a central vat 15 incorporating heating apparatus which maintains the metal at a temperature sufficient to retain it in a liquid condition. The molding material or metal used in the present preferred embodiment of the invention is composed of lead, tin, indium, and bismuth and melts at a temperature of 136° F.

Figure 2:
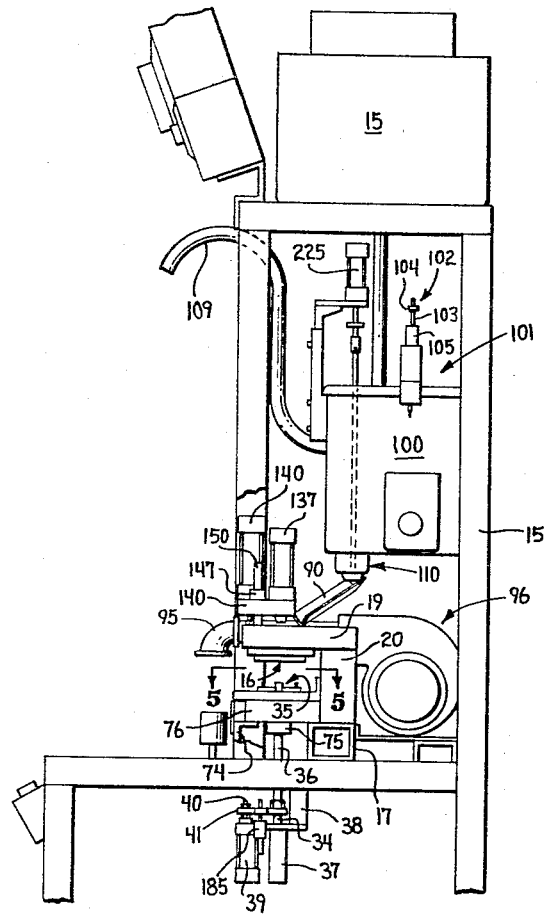
FIG. 2 is a side elevation of the structure illustrated in FIG. 1.
Figure 7:
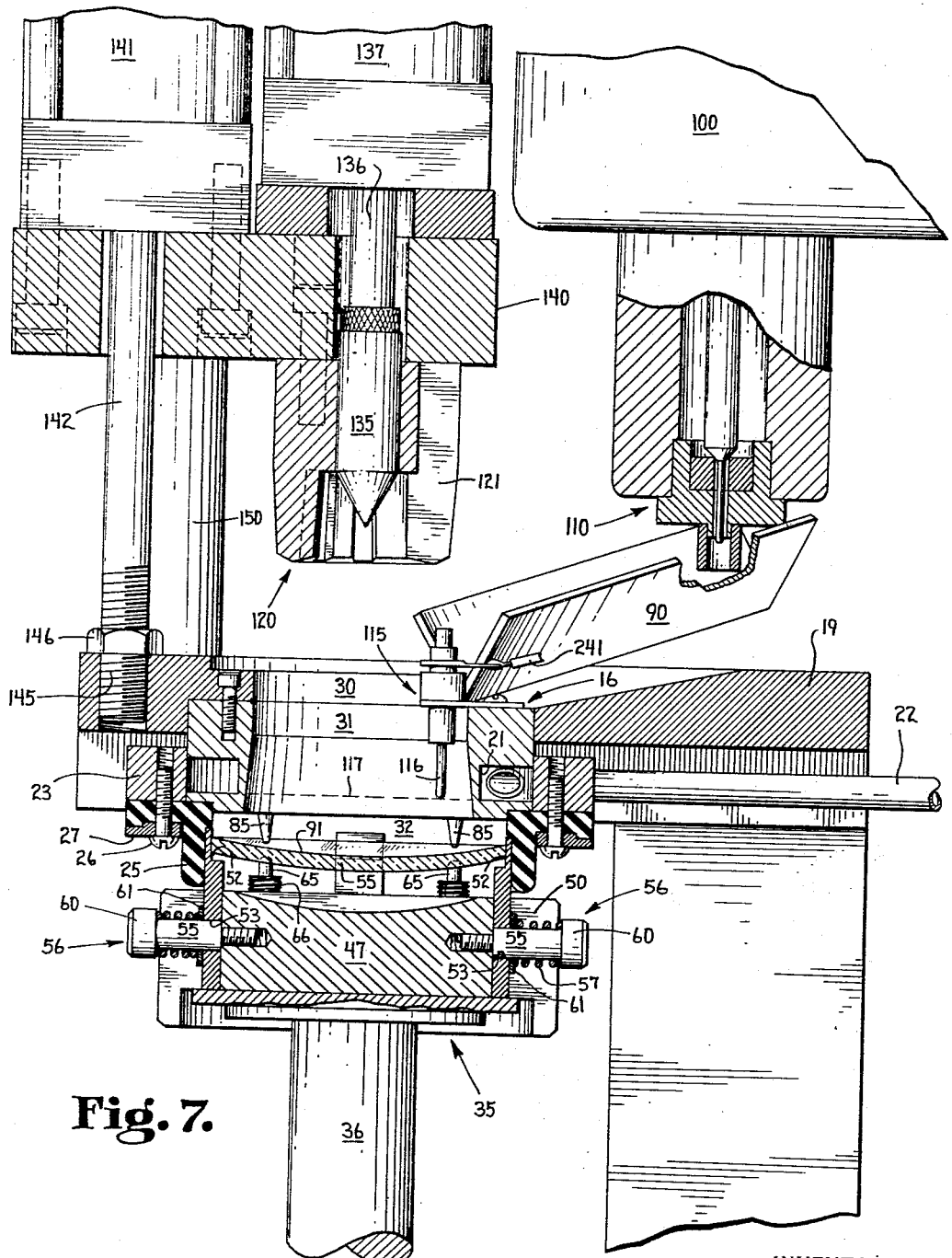
FIG. 7 is an enlarged vertical section taken along the line 7—7 of FIG. 1 in the direction of the arrows.
Figures 8, 9:
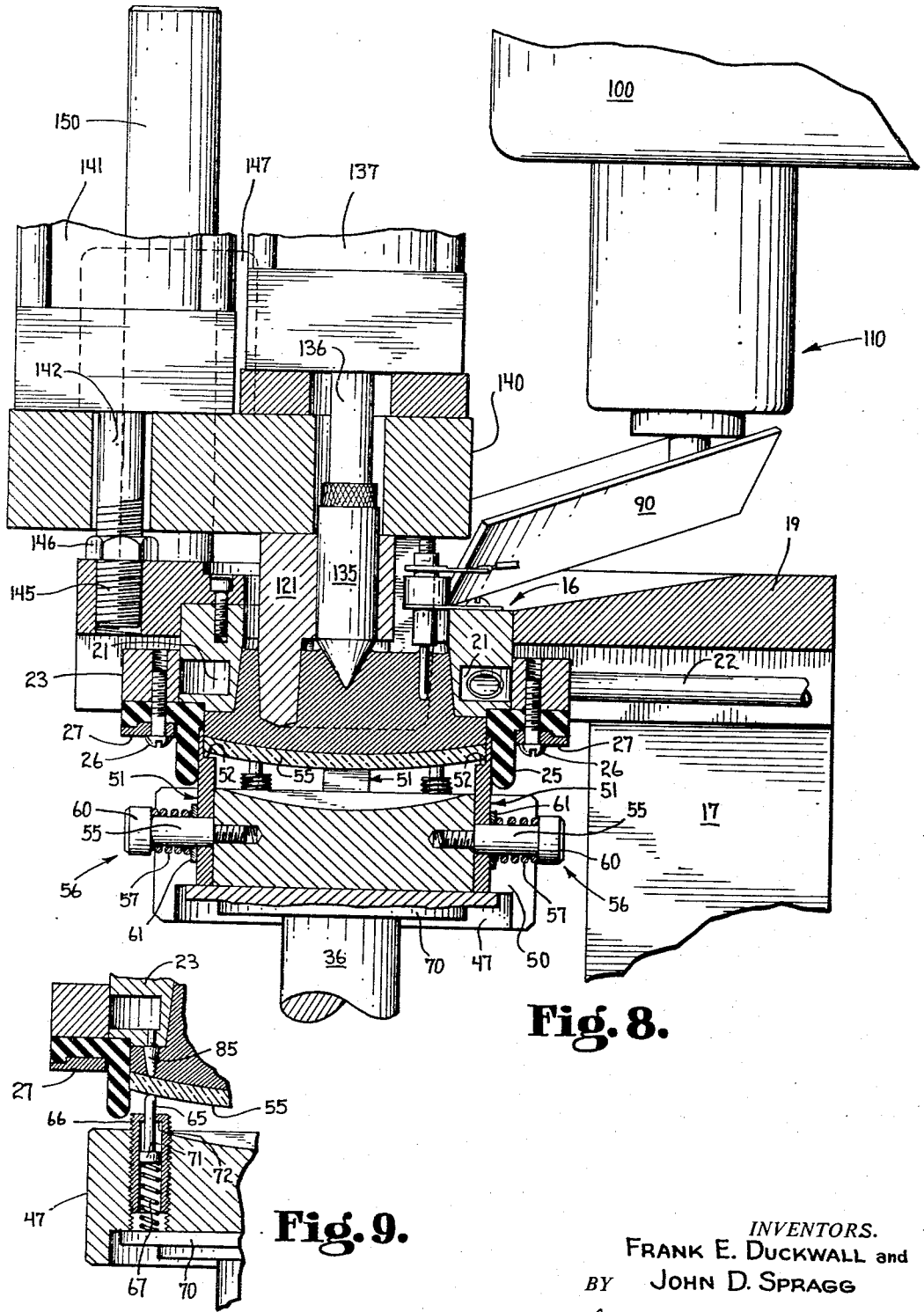
FIG. 8 is a view similar to FIG. 7 but showing the apparatus in a different operating position.
FIG. 9 is a fragmentary section taken along the line 9—9 of FIG. 6 in the direction of the arrows.

Since all of the stations 10–13 are identical, only the station 13 will be herein described, said station being illustrated particularly in FIGS. 2, 7 and 8. The molding apparatus includes the frame 15 which has a molding ring 16 fixedly mounted thereon by means of channels 17, upright members 20 and horizontal member 19. The molding ring 16 has a water cavity 21 therethrough which is supplied with cooling water through a conduit 22. The water flows through the cavity 21 and then out of the cavity through a conduit (not shown). The cavity 21 of the ring 16 is sealed off by a water jacket 23 fixedly mounted on ring 16. A depending rubber or resilient lip member 25 which is annular in configuration is secured to the jacket member 23 by a plurality of screws 26 and by a rigid member 27.

Figure 1:
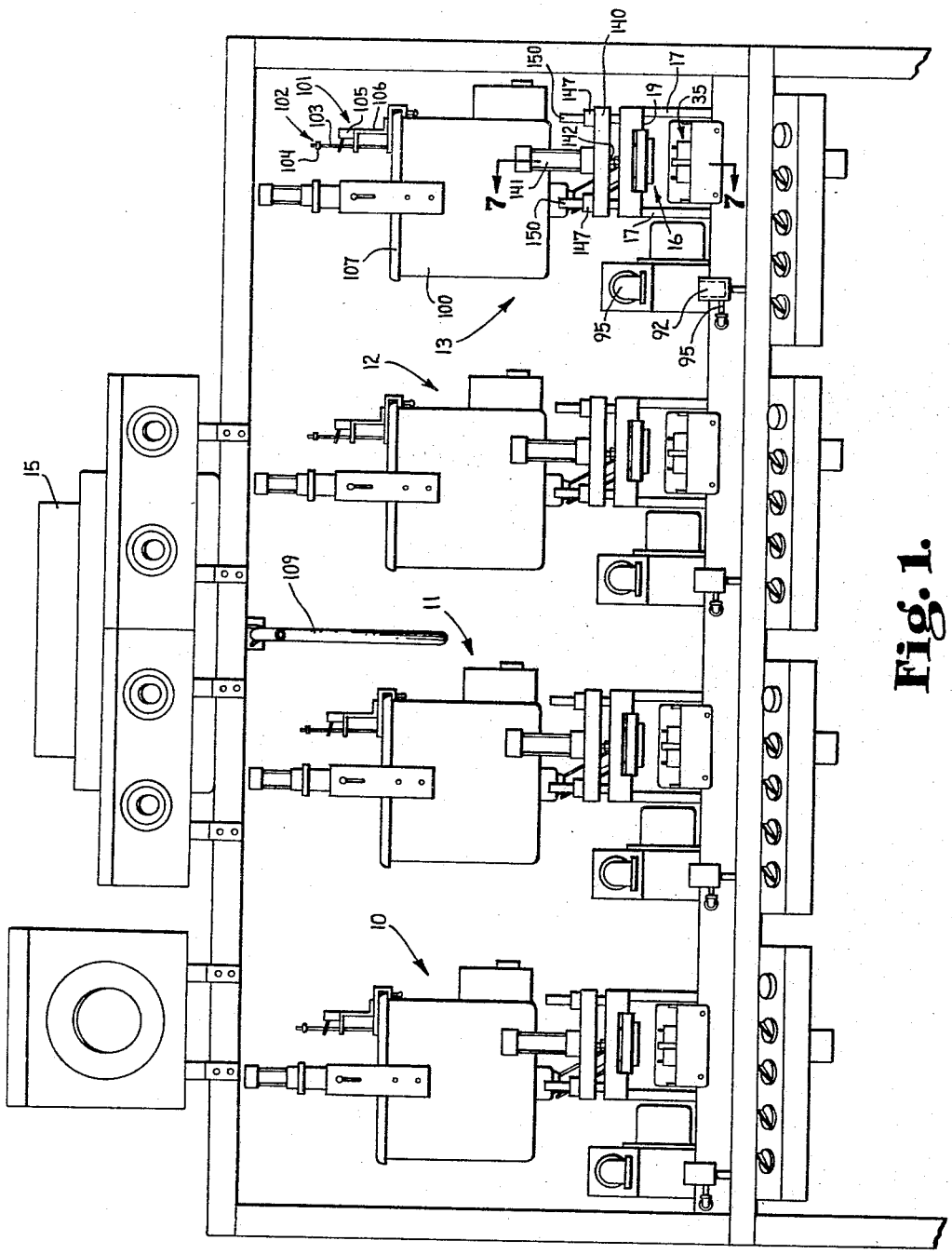
FIG. 1 is a front elevation of molding apparatus embodying the present invention.

The horizontal member 19 is formed with a central opening 30 coextensive with the central opening 31 through the ring 16. It will thus be seen that the openings 30, 31 and 32 through the member 19, ring 16 and depending rubber lip member 25, respectively, define a mold opening which extends completely through the mold, and thus has an open upper end and an open lower end when the molding device is in the operating position of FIG. 1.

The lens adapter assembly 35 is mounted on a guide post 36 which is mounted on the distal end of the piston 34 of an air motor 37 which is, in turn, mounted upon the frame 15, by brackets 38. Fixedly mounted on the air motor 37 is a commercially available damping device 39 arranged to slow down or cushion the stroke of the piston motor 37 when the piston 34 is on the upstroke. The piston 40 of the device 39 is fixed to the piston 34 by horizontal member 41. The damping device 39 may be, for example, a Hydrocheck device with a variable needle valve manufactured by Alkon Co. of Chicago, Illinois.

Figure 6:
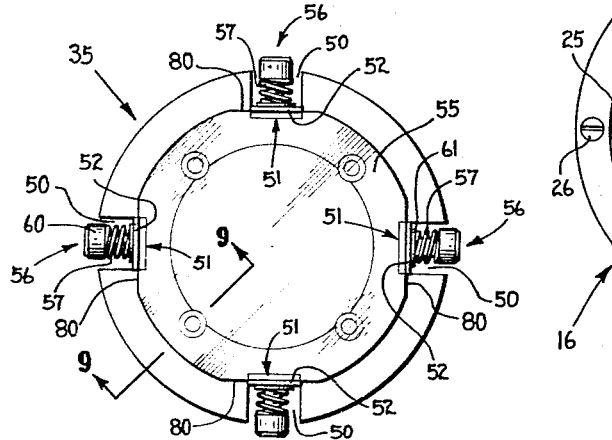
FIG. 6 is a horizontal section taken along the line 5—5 opposite to the direction of the arrows and with certain portions of the apparatus removed for clarity.
Figure 5:
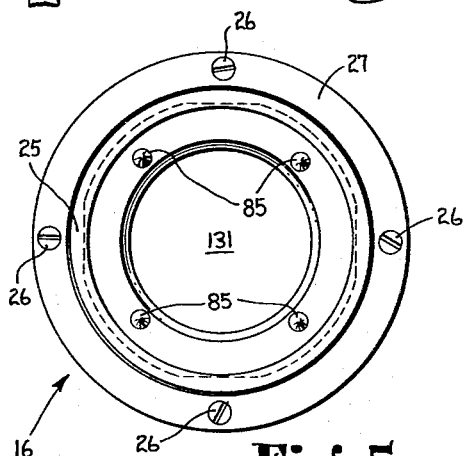
FIG. 5 is a horizontal section taken along the line 5—5 in FIG. 2 in the direction of the arrows and with certain portions of the apparatus removed for clarity.

The adapter assembly 35 includes a block 47 having four radially outwardly extending slots 50 (FIG. 6). Four fingers 51 are slidably received within the slots 50 and have upwardly and inwardly facing shouldered recesses 52 which receive and laterally position a lens 55. The fingers 51 each have a central aperture 53 therethrough through which extends the enlarged portion 55 of a shoulder bolt 56. The upright fingers 51 are normally retained in an inward position under the action of comparison springs 57 which act between the heads 60 and washers 61 received upon the enlarged portion of the bolts and bearing against the upright fingers 51.

A plurality of pins 65 are also mounted in the block 47 for vertically supporting the lens 55. As can best be seen in FIG. 9, the pins 65 are reciprocal within an externally threaded cylinder 66 which is threadedly received within the block 47. Each of the pins 65 has therebeneath a compression spring 67 which acts between a base member 70 and the head 71 of the pin 65 to yieldably maintain the pin projected and the head 71 bearing against the surface 72 of the cylinder 66. The base member 70 fixedly connects the block 47 and the guide post 36.

Referring to FIG. 2, a bushing 75 is press-fitted into a horizontally extending member 76 fastened to the vertical members 20 and the channels 17 and 74 and guides the guide post 36 so as to maintain the adapter assembly 35 accurately and coaxially positioned relative to the mold ring 16. It can be appreciated that the fingers 51 and the pins 65 provide accurate positioning of the lens with respect to the mold. Referring to FIG. 6, it can be seen that the lens 55 has four flat edges 80 against which bear the shouldered recesses 52 of the fingers. In some embodiments of the invention, there may be more or less of the flat surfaces 80, however, preferably at least one of the flat surfaces is needed in order to reference the lens in the grinding and polishing operations.

As will be apparent from the above description, one of the preliminary steps of applicants' invention is to position the lens to be blocked within the lower end of the mold opening defined by surfaces 30, 31 and 32. Thus, the lens 55 is moved to the position illustrated in FIG. 7 by projection of the piston 34 of the air cylinder 37. The damping action of the damping device 39 slows down the movement of the adapter assembly 35 at least at the end of its upward travel so that the engagement of the lens 55 with the pins 85 does not chip or fracture the lens 55.

Pins 85 which are fixed to the ring 16 actually position the lens for the molding operation. The number of pins 85 may vary. For example, three pins 85 are the preferred number for positioning a spherical lens surface while four are the preferred number for a toric lens surface. It will be noted that the lens 55 is completely spring mounted upon the adapter 35 so that when the lens 55 engages the fixed pins 85, the springs 57 and 67 can yield as the adapter finishes its upward movement permitting the lens to accurately position against the fixed pins 85, yet also permitting the lens 55, cooperating with the depending resilient lip 25, to close off the lower end of the mold opening.

A subsequent step of applicants' process involves the pouring of molten metal into the mold opening through the trough 90. It is necessary however, that the molten metal, when it hardens, adhere firmly to the surface 91 of the lens. It has been found desirable therefore to paint the surface 91 of the lens with lacquer prior to the molding of a block on the surface 91. This lacquering step is accomplished by placing the lens on a vacuum cup 92 (FIG. 1) provided for each station and mounted on the frame 15 of the apparatus. A vacuum is supplied to the cup 92 through a vacuum line 95. The vacuum holds the lens in place while the operator of the machine paints the surface 91 of the lens. During this painting step, heated air is blown at the surface 91 of the lens through an outlet 95 associated with a hot air blower 96 (FIG. 2).

A tank 100 is provided for each of the stations 10–13. Each of the tanks has an alarm system 101 which operates to ring a bell when the level of the molten metal within the tank drops below a certain height. The alarm system 101 includes a float 102, the upright arm 103 of which has a cross member 104 fixed thereto. A limit switch 105 is fixedly mounted upon a bracket 106 secured to the top 107 of the tank. When the float 102 drops within the tank sufficiently, the cross member 104 will engage the actuating arm of the switch 105 ringing a bell (not shown). At this time the operator can then use the hose 109 which leads from the vat 15 to fill the tank 100 with the molten metal.

At the lower end of each tank 100, there is provided a valve 110 which controls flow of the molten liquid from the tank 100 into the trough 90. When the valve 110 is open, the metal flows into the trough and into the mold openings 31 and 32 within the ring 16 and resilient lip 25 until the metal reaches a predetermined height within the mold opening. Fixedly mounted on the mold ring 16 is a probe 115 which has an electrically conductive depending portion 116. Since the molten metal used in forming the block is electrically conductive, the probe is used to sense the metal when it reaches the height indicated by dotted lines 117 and the valve 110 is automatically shut off as described below in connection with the electrical circuit.

As mentioned, water is continuously flowed through the conduit 22 to cool the ring 16 for hardening the metal block. Immediately subsequent to the pouring of the metal into the mold opening, an impressor assembly 120 is moved downwardly into the upper end of the mold opening to form the molten metal and to cool the molten metal.

Figure 4:
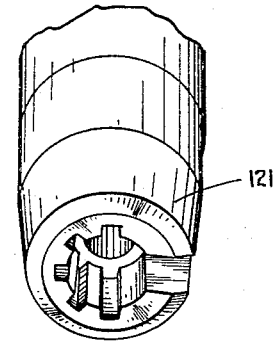
FIG. 4 is a perspective view of a forming die forming a part of the structure in FIGS. 1 and 2.
Figure 3:
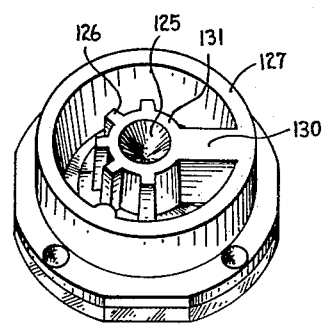
FIG. 3 is a perspective view of a molding block having a lens attached thereto.

The impressor assembly 120 may also be provided with water cooling passages for cooling and hardening the block. The impressor assembly 120 includes an external forming die 121 shown in perspective in FIG. 4 and having a configuration complementary to the shape desired in the rearward face of the block. This shape is shown in FIG. 3 as including a center cavity 125, a plurality of radially extending stubs 126, an outer cylindrical portion 127, and a radially extending relatively thick portion 130 connecting the outer cylindrical portion 127 with an inner cylindrical portion 131. The various portions 126, 127, 130 and 131 are formed by the forming die 121. The cavity 125 is formed by a conically tipped center former 135 which is slidably mounted within the forming die 121.

The center former 135 is guided by the forming die 121 and is mounted on the distal end of the piston 136 of an air cylinder 137. The air cylinder 137 is fixedly mounted upon a horizontally extending carriage member 140 upon which the lower end of an air motor 141 is mounted. (See also FIG. 1.) The piston 142 of the air motor is connected to the horizontal member 19 by threads 145 and 146. The horizontal carriage member 140 is provided with a pair of press fitted bushings 147 through which extend guide posts 150 fixed to the horizontal member 19. The carriage member 140, which has the forming die 121 fixed thereto, can be moved through an accurate path by reason of guide posts 150 whereby the forming die 121 is always accurately moved to the same position as illustrated in FIG. 8 within the mold openings 30, 31 and 32.

Figure 10:
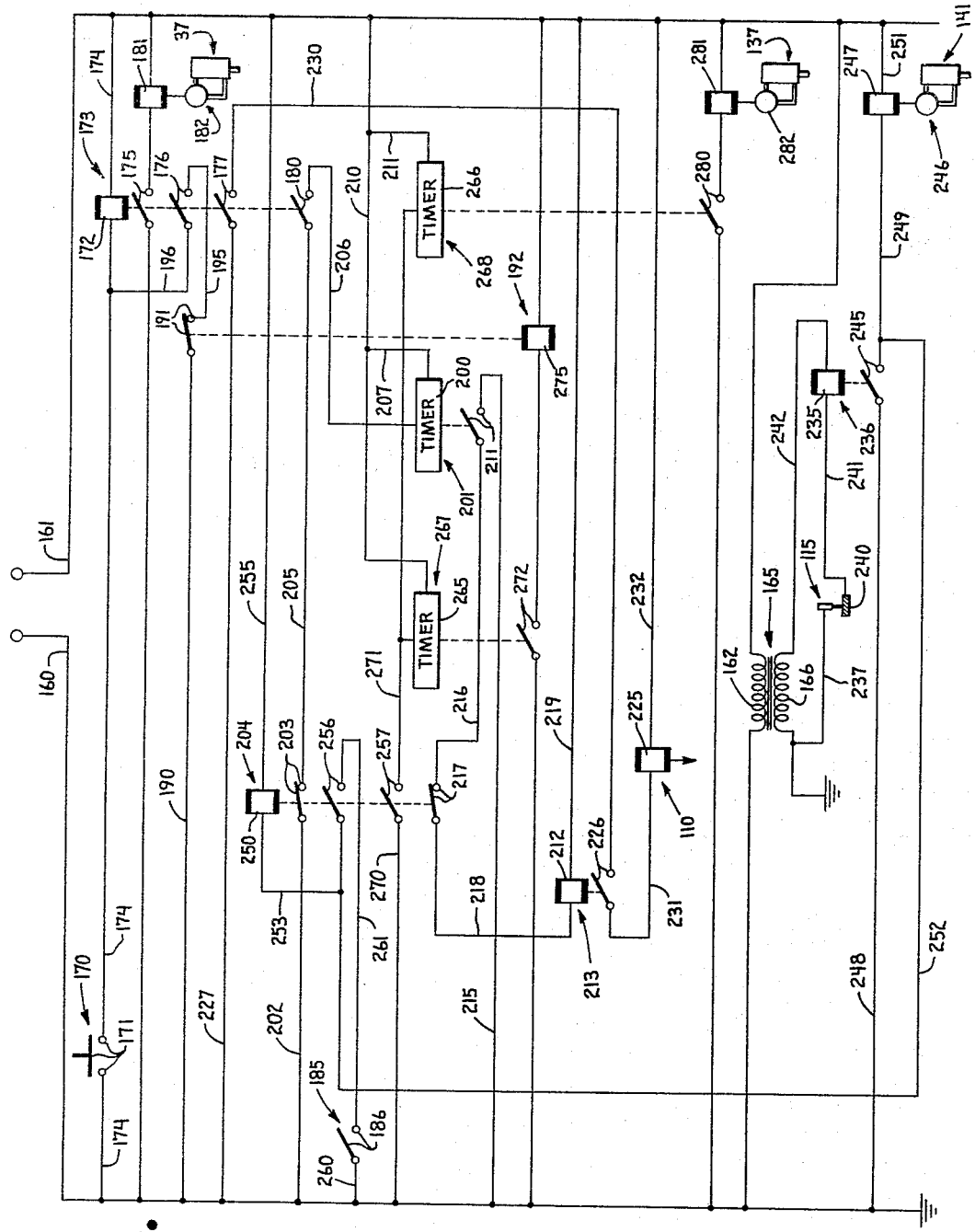
FIG. 10 is a schematic electrical diagram of the molding apparatus of the present invention.

The electrical circuit of the present machine is illustrated in FIG. 10 and includes input lines 160 and 161. Connected across the lines 160 and 161 is the primary 162 of a transformer 165. In the preferred embodiment of the invention, the voltage applied across the lines 160 and 161 is 110 volts which is dropped by the transformer 165 to six volts at the secondary 166 of the transformer whereby the probe 115 carries a maximum of six volts for safety purposes. The electrical circuit of the present machine will be further described in connection with a description of the operation of the machine.

The operator moves to the station 13, lifts the painted lens from the cup 92 and places it upon the adapter assembly 35 properly referencing it by placing the flat surfaces 80 in engagement with the recesses 52 of fingers 51. The adapter assembly 35 is initially in the down position illustrated in FIGS. 1 and 2. The operator then presses the start buton 170 closing its contacts 171 and energizing the solenoid 172 of a relay 173 through lines 160, 161, and 174 and contacts 171. The operator then paints another lens with lacquer and places it on the vacuum cup 92 where it is dried by the drier 96 in preparation for a subsequent cycle of the station 13. The operator then moves on to the next station where he repeats the above steps.

At the station 13, energization of the relay 173 closes the contacts 175, 176, 177 and 180 thereof. Closure of the contacts 175 energizes the solenoid 181 of a two-way or four-way air valve 182 controlling the air pressure supply to the piston motor 37 causing it to project its piston 34. The valve 182, which may be, for example, a Tec-Hacket IJAS4 manufactured by Neumatic of Fort Wayne, Indiana, is operable to connect one end of the piston motor 37 to air pressure and the other end to atmosphere and upon energization or deenergization to reverse the air pressure atmosphere connection. A limit switch 185, FIGS. 2 and 10, is mounted on the bracket 38 and is permitted to close its contacts 186 as the horizontal member 41 moves away from the actuating arm of the limit switch. Closing of the contacts 176 locks in the relay 173 through the line 190, contacts 191 of relay 192, line 195, contacts 176, line 196, solenoid 172 and line 174. The locking in of the relay maintains it energized even though the contacts 171 of push button switch 170 remain closed only a short period of time. Closing of contacts 177 has no immediate effect.

Closing of the contacts 180 energizes the solenoid 200 of a timer relay 201 through the line 202, contacts 203 of relay 204, line 205, contacts 180, line 206, solenoid 200, line 207 and line 210. The adapter assembly with its lens thereon is then moved upwardly until the lens is seated firmly against the pins 85. The timer 201 then completes its timing cycle and closes its contacts 211. Closing of the contacts 211 energizes the solenoid 212 of a relay 213 through the line 215, contacts 211 of the timer 201, line 216, contacts 217 of relay 204, line 218, solenoid 212 of relay 213 and line 219.

A solenoid 225 is arranged to open the valve 110 on the tank 100 when the solenoid 225 is energized and to close the valve 110 when the solenoid 225 is deenergized. Energization of the solenoid 212 of the relay 213 closes the contacts 226 thereof energizing the solenoid 225 through the line 227, contacts 177, line 230, contacts 226, line 231, solenoid 225 and line 232. Thus, the molten metal starts to pour into the mold openings 30, 31 and 32 through the valve 110 and trough 90. The metal rises in the mold opening until it reaches the conductor 116 of the probe 115.

The solenoid 235 of relay 236 is energized by the closing of the circuit through the secondary 166, the line 237, the metal 240, the probe 115, the line 241, the solenoid 235, and the line 242. Energization of the relay 236 causes its contacts 245 to close energizing solenoid 247 through line 248, contacts 245, and lines 249 and 251. The air cylinder 141 is provided with a two-way valve 246 which is operated by energization of solenoid 247 to cause air pressure to retract the piston 142 and to lower the impresser assembly 120 downwardly into the metal as viewed in FIG. 8.

Closing of the contacts 245 also energizes the solenoid 250 of the relay 204 through line 248, contacts 245, line 252, line 253, solenoid 250 and line 255. The relay 204 is thereby actuated to close its contacts 256 and 257 and to open its contacts 203 and 217. Opening of the contacts 203 deenergizes the timer solenoid 200 causing the contacts 211 thereof to open. Opening of contacts 211 deenergizes the solenoid 212 of relay 213 opening its contacts 226 and closing off flow of molten metal into the mold opening by de-energizing solenoid 225.

The closing of the contacts 256 locks in the relay 250 and retains the air valve 246 in the down position for air motor 141 even though contacts 245 should later open, locking in of the solenoid being accomplished through line 260, contacts 186, line 261, contacts 256, the solenoid 250 and line 255. The solenoid 247 of the valve 246 is locked in through line 260, contacts 186, line 261, contacts 256, lines 252 and 249, solenoid 247 and line 251.

The closing of the contacts 257 energizes the timer solenoids 265 and 266 of the timers 267 and 268, respectively, through the line 270, contacts 257, line 271, the solenoids 265 and 266, and the lines 210 and 211. Timer 267 is set to time out after the block has hardened at which time its contacts 272 close energizing the solenoid 275 of relay 192 and causing it to open its contacts 191. The solenoid 172 of relay 173 is thereby de-energized opening its contacts 175, 176, 177 and 180. Opening of the contacts 175 de-energizes the solenoid 181 reversing the air valve 182 and causing the air motor 37 to lower the adapter assembly 35. Opening of contacts 176 and 177 has no effect at this time except to prepare the machine for its next cycle. Opening of the contacts 180 deenergizes the solenoid 200 of the timer 201 preparing the circuit for the next cycle.

Simultaneously with the closing of contacts 272 of the timer 267, the contacts 280 of the timer 268 close energizing the solenoid 281 of the air valve 282 for the air motor 137 causing it to project its piston and the center former 135 pushing the block out of the mold and away from the forming die 121 and the probe 115. The adapter assembly 35 thus carries the lens and block downwardly under the action of the air cylinder 37 to the starting position of the lens. When the adapter bottoms, the limit switch 185 opens the contacts 186 deenergizing the solenoid 250 of the relay 204 and deenergizing the solenoid 247 for the air valve 246. Thus, the air piston motor 141 raises the impresser assembly 120 back to starting position.

The deenergization of the solenoid 250 opens the contacts 257 deenergizing the timer 268 and opening its contacts 280. The solenoid 281 is thereby deenergized reversing the air valve 282 and causing the piston 136 of the air cylinder 137 to retract to the starting position of the apparatus. By the time the operator has worked his way along the stations 10–12 and returned to the station 13, the laquer is dry on the lens on the vacuum cup 92 and the various above described automatic operations of the machine have been completed whereby the machine is ready for another cycle.

It will be evident from the above description that the present invention provides a method and apparatus for blocking a lens in such a manner that it does not overhang the lens block. It will also be evident that the present invention provides a method and apparatus for blocking a lens in such a manner that the lens block is thin walled and block height can be easily adjusted.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. Apparatus for blocking a lens blank comprising a mold having a mold opening extending therethrough, a resilient annular lip forming an extension of the mold opening at one end thereof, said lip being formed of an elastically stretchable rubberlike material, means for inserting the lens blank in the lip with the edges of the lens blank being completely surrounded by said lip and engaged by said lip closing off the one end thereof, said lip having a passage therethrough which is generally constant in internal configuration in the direction of the axis thereof and is defined by inwardly facing surfaces which are adapted to engage the outer edges of the lens blank, and means for placing molding material in the other end of the mold opening and inside of said lip passage so that the molding material passes into the region where it is surrounded annularly by the lip, said lip being sufficiently resiliently deformable to permit removal of the lens and molding material from the mold after the molding material has hardened.

2. Apparatus for blocking a lens blank comprising a mold ring having a mold surface opening therethrough, an adapter, said adapter including a block, fingers slidably mounted on said block for inward and outward movement, spring means acting between said block and fingers to bias said fingers inwardly, said fingers having inwardly and upwardly facing recesses adapted to receive the lens blank for resilient gripping thereof, upwardly projecting pins spring mounted on said block for supporting the lens blank, means for moving said adapter with the lens blank supported on said pins and in said fingers into a position wherein the edges of the supported lens blank and the upper ends of said fingers are completely surrounded by said mold surface and are engaged by said mold closing off the lower end of said mold opening, and a means leading to the upper end of said opening for supplying liquid molding material thereto, said mold being sufficiently resilient to permit removal of the lens and molding material from the mold after the molding material has hardened.

3. Apparatus for blocking a lens comprising a mold ring having a vertically extending mold surface opening therethrough, an adapter, pins fixed to said ring and projecting downwardly into said opening, means for moving said adapter with the lens supported thereon upwardly into said opening to cause the supported lens to close the lower end of said mold opening and abut said pins, and a means leading to the upper end of said opening for supplying liquid molding material thereto.

4. Apparatus for blocking a lens blank comprising a mold ring having a vertically extending mold surface opening therethrough, a resilient lip secured to said ring and forming an extension of said mold surface opening at the lower end thereof, at least three pins fixed to said ring and projecting downwardly into said opening, an adapter, means for moving said adapter with the lens supported thereon upwardly into said resilient lip to cause the supported lens to close the lower end of said mold opening, a trough leading into the upper end of said mold opening, and means including an electrical probe projecting down into the upper end of said mold opening for controlling flow of molding material, through said trough into said mold opening and stopping said flow when the molding material has risen up to said probe.

5. Apparatus for blocking a lens blank comprising a mold ring having a vertically extending mold surface opening therethrough, a resilient rubber lip secured to said ring and forming an extension of said mold surface opening at the lower end thereof, at least three pins fixed to said ring and projecting downwardly into said opening, an adapter, means for moving said adapter with the lens supported thereon upwardly into said rubber lip to cause the supported lens to close the lower end of said mold opening, a trough leading into the upper end of said mold opening, means including an electrical probe projecting down into the upper end of said mold opening for controlling flow of molding material through said trough into said mold opening and stopping said flow when the molding material has risen up to said probe, a forming die reciprocably mounted for movement into the upper end of said mold opening, said forming die having a passage therethrough for the passage of cooling fluid through said forming die, means for moving said die into a position in said molding material and for holding said die in said position for a predetermined period of time, said die being so located when in said position as to form thin easily cooled walls in the molding material.

6. Apparatus for blocking a lens blank having a finished optical surface to provide means for supporting the blank during subsequent optical finishing thereof comprising a mold ring having a vertically extending mold surface opening therethrough, a resilient rubber lip secured to said ring and forming an extension of said mold surface opening at the lower end thereof, at least three pins fixed to said ring and projecting downwardly into said opening, an adapter, a plurality of fingers secured to said adapter and projecting upwardly, each of said fingers having an inwardly and upwardly facing recess for supporting a lens, at least one of said fingers being received within a slot in said adapter for in and out sliding movement, spring means mounted on said adapter and resiliently urging said one finger inwardly against said lens, means for moving said adapter with the lens supported thereon upwardly into said rubber lip to cause the supported lens to close the lower end of said mold opening, a trough leading into the upper end of said mold opening, means including an electrical probe projecting down into the upper end of said mold opening for controlling flow of molding material through said trough into said mold opening and stopping said flow when the molding material has risen up to said probe, a forming die reciprocably mounted for movement into the upper end of said mold opening, said forming die having a passage therethrough for the passage of cooling fluid through said forming die, means for moving said die into a position in said molding material and for holding said die in said position for a predetermined period of time, said die being so located when in said position as to form thin easily cooled walls in the molding material.

7. Apparatus for blocking a lens blank having a finished optical surface to provide means for supporting the blank during subsequent optical finishing thereof comprising a mold ring having a vertically extending mold surface opening therethrough, a resilient rubber lip secured to said ring and forming an extension of said mold surface opening at the lower end thereof, at least three pins fixed to said ring and projecting downwardly into said opening, an adapter, a plurality of fingers secured to said adapter and projecting upwardly, each of said fingers having an inwardly and upwardly facing recess for supporting a lens, at least one of said fingers being received within a slot in said adapter for in and out sliding movement, spring means mounted on said adapter and resiliently urging said one finger inwardly against said lens, means for moving said adapter with the lens supported thereon upwardly into said rubber lip to cause the supported lens to close the lower end of said mold opening, a trough leading into the upper end of said mold opening, means including an electrical probe projecting down into the upper end of said mold opening for controlling flow of molding material through said trough into said mold opening and stopping said flow when the molding material has risen up to said probe, an impresser reciprocably mounted for movement into the upper end of said mold opening, said impresser having a passage therethrough for the passage of cooling fluid through said impresser, means for moving said impresser into a position in said molding material and for holding said impresser in said position for a predetermned period of time, said impresser being so located when in said position as to form thin easily cooled walls in the molding material, said impresser including a forming die and a center former mounted centrally of said forming die, and means for projecting said center former through said mold opening for ejecting the molded product from the mold opening.

8. Apparatus for blocking a lens blank having a finished optical surface to provide means for supporting the blank during subsequent optical finishing thereof comprising a mold ring having a vertically extending mold surface opening therethrough, a resilient rubber lip secured to said ring and forming an extension of said mold surface opening at the lower end thereof, at least three pins fixed to said ring and projecting downwardly into said opening, an adapted, a plurality of fingers secured to said adapter and projecting upwardly, each of said fingers having an inwardly and upwardly facing recess for supporting a lens, at least one of said fingers being received within a slot in said adapter for in and out sliding movement, spring means mounted on said adapter and resiliently urging said one finger inwardly against said lens, a plurality of support members reciprocably mounted on said adapter for supporting said lens, spring means acting between said adapter and said support members, means for moving said apater with the lens supported thereon upwardly into said rubber lip to cause the supported lens to close the lower end of said mold opening and abut said pins, a trough leading into the upper end of said mold opening, means including an electrical probe projecting down into the upper end of said mold opening for controlling flow of molding material through said trough into said mold opening and stopping said flow when the molding material has risen up to said probe, a forming die reciprocably mounted for movement into the upper end of said mold opening, said forming die having a passage therethrough for the passage of cooling fluid through said forming die, means for moving said die into a position in said molding material and for holding said die in said position for a predetermined period of time, said die being so located when in said position as to form thin easily cooled walls in the molding material.

9. The method of blocking a lens comprising the steps of providing a mold with a mold surface opening of constant cross section and extending vertically completely through said mold, resiliently deforming said mold at the lower end thereof to insert and dispose a lens blank to be blocked within the lower end of said opening with the lens edge within the opening, pouring the blocking material into the mold cavity through the upper end of said mold opening and after the blocking material is hard withdrawing the blocked lens from the lower end of the mold by resilient deformation of the mold whereby destruction of the mold is avoided.

10. The method of blocking a lens comprising the steps of providing a mold with a mold surface opening extending vertically completely through said mold, resiliently deforming said mold at the lower end thereof to insert and dispose a lens blank to be blocked within the lower end of said opening with the lens edge within the opening, heating blocking material to a molten temperature and pouring the blocking material into the mold cavity through the upper end of said mold opening, forming and cooling the blocking material by inserting a forming die into the mold opening through the upper end of said opening, and flowing water through said forming die to cool it and to solidify the blocking material.

11. The method of temporarily blocking a lens having a finished optical surface to provide means for supporting the lens during subsequent optical finishing thereof, said method comprising the steps of providing a mold with a mold surface opening extending vertically completely through said mold, resiliently deforming said mold at the lower end thereof to insert and dispose the lens to be blocked within the lower end of said opening with the finished blank surface facing inwardly of the opening and with the lens edge within the opening and at least portions thereof engaging and resiliently deforming the walls of said opening, providing a blocking material which is adapted to be relatively rigid and strong at room temperature and which is adapted to flow at an elevated temperature substantially lower than that which could cause deformation of the blank, said blocking material being adapted to adhere to said lens surface when said blocking material is heat softened, heating the blocking material to said elevated temperature and pouring the blocking material into the mold opening through the upper end of said mold opening, forming and cooling the blocking material by inserting a forming die into the mold opening through the other end of said opening, flowing water through said forming die to cool it and to solidify the blocking material, allowing the blocking material to cool to room temperature within the mold opening for adhering the blocking material to said lens surface and for solidfying the blocking material to form a strong and rigid lens block having the configuration of said mold opening and forming die, and moving said lens block and said adhering lens blank from said mold.

12. The method of temporarily blocking a lens having a finished optical surface to provide means for supporting the lens during subsequent optical finishing thereof, said method comprising the steps of providing a mold with a mold surface opening extending completely through said mold, painting the finished lens surface with a compound increasing the adhering tendency of said finished surface, resiliently deforming said mold at one end thereof to insert and dispose the lens to be blocked within one end of said opening with the finished blank surface facing inwardly of the opening and with the lens edge within the opening and at least portions thereof engaging and resiliently deforming the walls of said opening, providing a blocking material which is adapted to be relatively rigid and strong at room temperature and which is adapted to flow at an elevated temperature substantially lower than that which could cause deformation of the blank, said blocking material being adapted to adhere to said compound when said blocking material is heat softened, heating the blocking material to said elevated temperature and flowing the blocking material into the mold opening through the other end of said mold opening, forming and cooling the blocking material by inserting a forming die into the mold opening through the other end of said opening, flowing water through said forming die and mold to cool them and to solidify the blocking material, allowing the blocking material to cool to room temperature within the mold opening for adhering the blocking material to said lens surface and for solidifying the blocking material to form a strong and rigid lens block having the configuration of said mold opening and molding die, and ejecting said lens block and said adhering lens from said mold by projecting a portion of said forming die through said mold opening.

13. The method of temporarily blocking a lens having a finished optical surface to provide means for supporting the lens during subsequent optical finishing thereof, said method comprising the steps of providing a mold with a mold surface opening extending vertically completely through said mold, resiliently deforming said mold at the lower end thereof to insert and dispose the lens to be blocked within the lower end of said opening with the finished surface facing inwardly of the opening and with the lens edge within the opening and at least portions thereof engaging and resiliently deforming the walls of said opening, providing a blocking material which is adapted to adhere to said lens surface when said blocking material is heat softened, heating the blocking material to a molten temperature and pouring the blocking material into the mold opening through the upper end of said mold opening, forming and cooling the blocking material by inserting a forming die into the mold opening through the other end of said opening, flowing water through said forming die to cool it and to solidify the blocking material, allowing the blocking material to cool to room temperature within the mold opening for adhering the blocking material to said lens surface and for solidifying the blocking material to form a strong and rigid lens block having the configuration of said mold opening and forming die, and moving said lens block and said adhering lens blank from said mold.

14. The method of temporarily blocking a lens having a finished optical surface to provide means for supporting the lens during subsequent optical finishing thereof, said method comprising the steps of providing a mold with a mold surface opening extending vertically completely through said mold, resiliently deforming said mold at the lower end thereof to insert and dispose the lens to be blocked within the lower end of said opening with the finished surface facing inwardly of the opening and with the lens edge within the opening and at least portions thereof engaging and resiliently deforming the walls of said opening, providing a blocking material which is adapted to be relatively rigid and strong at room temperature and which is adapted to flow at an elevated temperature substantially lower than that which could cause deformation of the blank, said blocking material being adapted to adhere to said lens surface when said blocking material is heat softened, heating the blocking material to said elevated temperature and pouring the blocking material into the mold opening through the upper end of said mold opening, forming and cooling the blocking material by inserting a forming die into the mold opening through the other end of said opening, and flowing water through said forming die to cool it and to solidify the blocking material.

15. The method of blocking a lens comprising the steps of providing a mold with a mold cavity of constant cross seection and opening externally of the mold, resiliently deforming said mold at said external opening to insert and dispose a lens blank to be blocked within said cavity with the lens edge within the cavity and the lens closing off said opening, and placing blocking material within the mold cavity and after the blocking material is hard withdrawing the blocked lens from the mold by resilient deformation of the mold at said external opening whereby destruction of the mold is avoided.

References Cited
UNITED STATES PATENTS

| | | | |
|---|---|---|---|
| 1,695,458 | 12/1928 | Goddard | 22—202 |
| 2,230,118 | 1/1941 | Moulton. | |
| 2,304,984 | 12/1942 | Wood | 18—36 X |
| 2,559,860 | 7/1951 | Fay | 18—36 |
| 2,559,861 | 7/1951 | Fay | 18—36 |
| 3,056,166 | 10/1962 | Weinberg | 18—39 |
| 3,070,846 | 1/1963 | Schrier | 18—39 |
| 3,131,431 | 5/1964 | Kolany et al. | 18—26 |
| 3,136,000 | 6/1964 | Slyk | 18—39 |
| 3,210,894 | 10/1965 | Bentley et al. | 51—277 X |
| 3,221,378 | 12/1965 | Faas et al. | 22—58 |

J. SPENCER OVERHOLSER, *Primary Examiner.*

VERNON K. RISING, *Assistant Examiner.*